(12) United States Patent
Matsuda

(10) Patent No.: US 12,460,592 B2
(45) Date of Patent: Nov. 4, 2025

(54) ENERGY GENERATOR AND ENERGY SUPPLY SYSTEM

(71) Applicant: KAWASAKI JUKOGYO KABUSHIKI KAISHA, Kobe (JP)

(72) Inventor: Yoshimoto Matsuda, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/546,157

(22) PCT Filed: Feb. 17, 2021

(86) PCT No.: PCT/JP2021/005930
§ 371 (c)(1),
(2) Date: Aug. 11, 2023

(87) PCT Pub. No.: WO2022/176062
PCT Pub. Date: Aug. 25, 2022

(65) Prior Publication Data
US 2024/0133349 A1   Apr. 25, 2024
US 2024/0229729 A9   Jul. 11, 2024

(51) Int. Cl.
*F02D 29/06*   (2006.01)
*B25J 5/00*   (2006.01)
(Continued)

(52) U.S. Cl.
CPC ............. *F02D 29/06* (2013.01); *B25J 5/00* (2013.01); *B60K 5/12* (2013.01); *B62D 57/032* (2013.01);
(Continued)

(58) Field of Classification Search
CPC ... F02D 29/06; B25J 5/00; B60K 5/12; B62D 57/032; F01P 3/18; F02M 37/0047; F02B 2063/095
(Continued)

(56) References Cited

U.S. PATENT DOCUMENTS 4,565,487 A  *  1/1986  Kroczynski ............... B60F 3/00
                                                    414/730
6,362,533 B1   3/2002  Morohoshi et al.
(Continued)

FOREIGN PATENT DOCUMENTS

CN        2246054 Y  *  1/1997
CN    101678866 A  *  3/2010  ........... B62D 57/032
(Continued)

OTHER PUBLICATIONS

CN-111483312-A (Tang, Y) (Aug. 4, 2020)(Machine Translation) (Year: 2020).*
(Continued)

*Primary Examiner* — Hung Q Nguyen
(74) *Attorney, Agent, or Firm* — Alleman Hall & Tuttle LLP

(57) ABSTRACT

An energy generator includes: an internal combustion engine; a power generator that is driven by the internal combustion engine to generate operating power; a communication interface that receives information given from working equipment; a supply interface that supplies the operating power to the working equipment; and circuitry configured to control at least one of the internal combustion engine and the power generator based on information given from the working equipment through the communication interface.

19 Claims, 7 Drawing Sheets

(51) Int. Cl.
    *B60K 5/12*     (2006.01)
    *B62D 57/032*   (2006.01)
    *F01P 3/18*     (2006.01)
    *F02M 37/00*    (2006.01)
    *F02B 63/04*    (2006.01)

(52) U.S. Cl.
    CPC ........... *F01P 3/18* (2013.01); *F02M 37/0047* (2013.01); *F02B 2063/045* (2013.01)

(58) Field of Classification Search
    USPC ........................................................ 180/8.5
    See application file for complete search history.

(56) References Cited

U.S. PATENT DOCUMENTS

| | | | |
|---|---|---|---|
| 6,505,098 | B1 | 1/2003 | Sakamoto et al. |
| 2006/0176162 | A1 | 8/2006 | Miekley et al. |
| 2010/0090638 | A1 | 4/2010 | Saunders et al. |
| 2016/0023699 | A1* | 1/2016 | Saunders ............... B25J 9/1612 60/428 |
| 2017/0371342 | A1 | 12/2017 | Hashimoto et al. |
| 2021/0397193 | A1* | 12/2021 | Aramburu ............... C10B 53/02 |

FOREIGN PATENT DOCUMENTS

| | | | | |
|---|---|---|---|---|
| CN | 111483312 | A * | 8/2020 | |
| JP | S51043715 | U1 | 3/1976 | |
| JP | 2000328955 | A | 11/2000 | |
| JP | 2001191276 | A | 7/2001 | |
| JP | 2003089077 | A | 3/2003 | |
| JP | 2006172782 | A | 6/2006 | |
| JP | 2006201171 | A | 8/2006 | |
| JP | 2014161162 | A * | 9/2014 | |
| JP | 2017137763 | A1 | 8/2017 | |
| JP | 2017522195 | A * | 8/2017 | ........... B62D 57/032 |
| JP | 2020190235 | A | 11/2020 | |
| WO | 2016014238 | A1 | 1/2016 | |
| WO | 2016103303 | A1 | 6/2016 | |

OTHER PUBLICATIONS

CN-2246054-Y) (Jin et al.) (Jan. 29, 1997) (Machine Translation) (Year: 1997).*

* cited by examiner

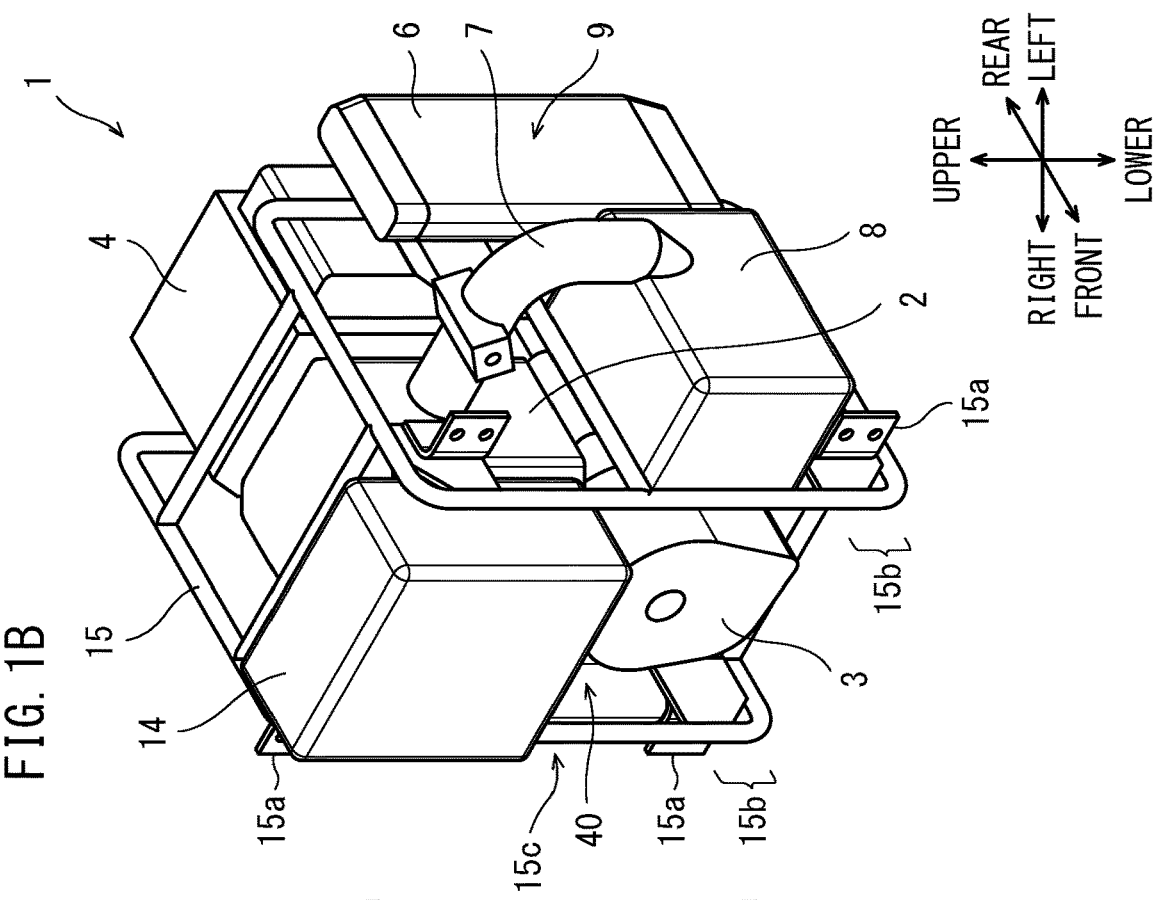
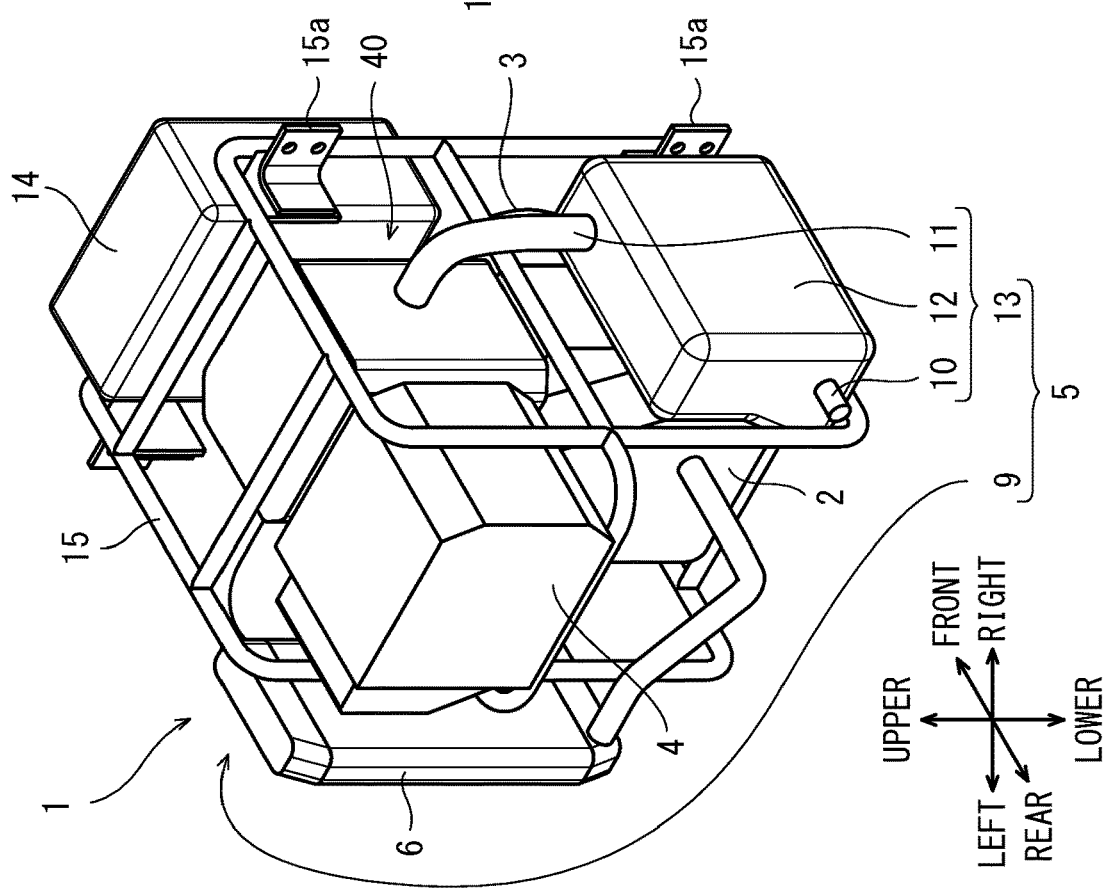

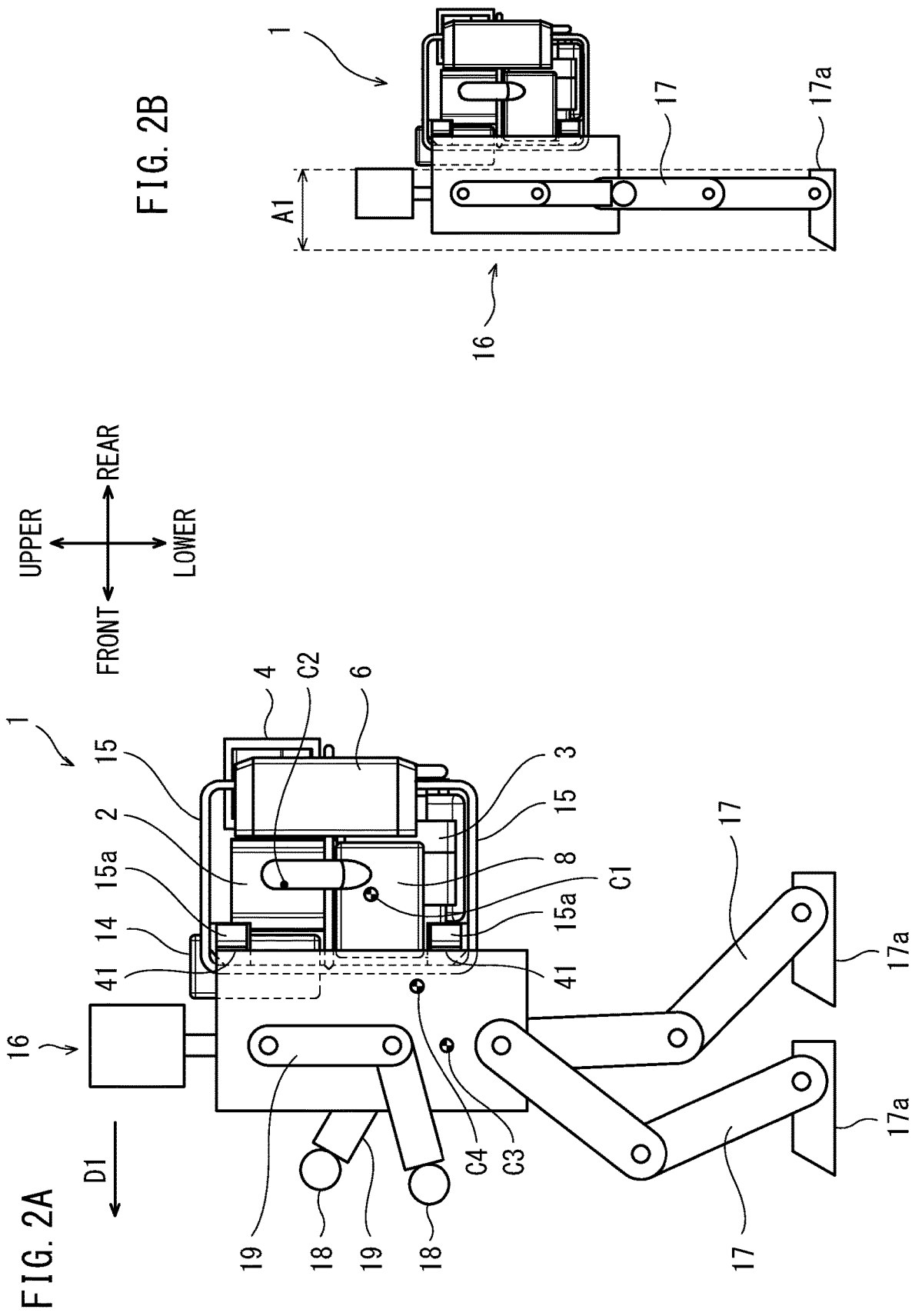

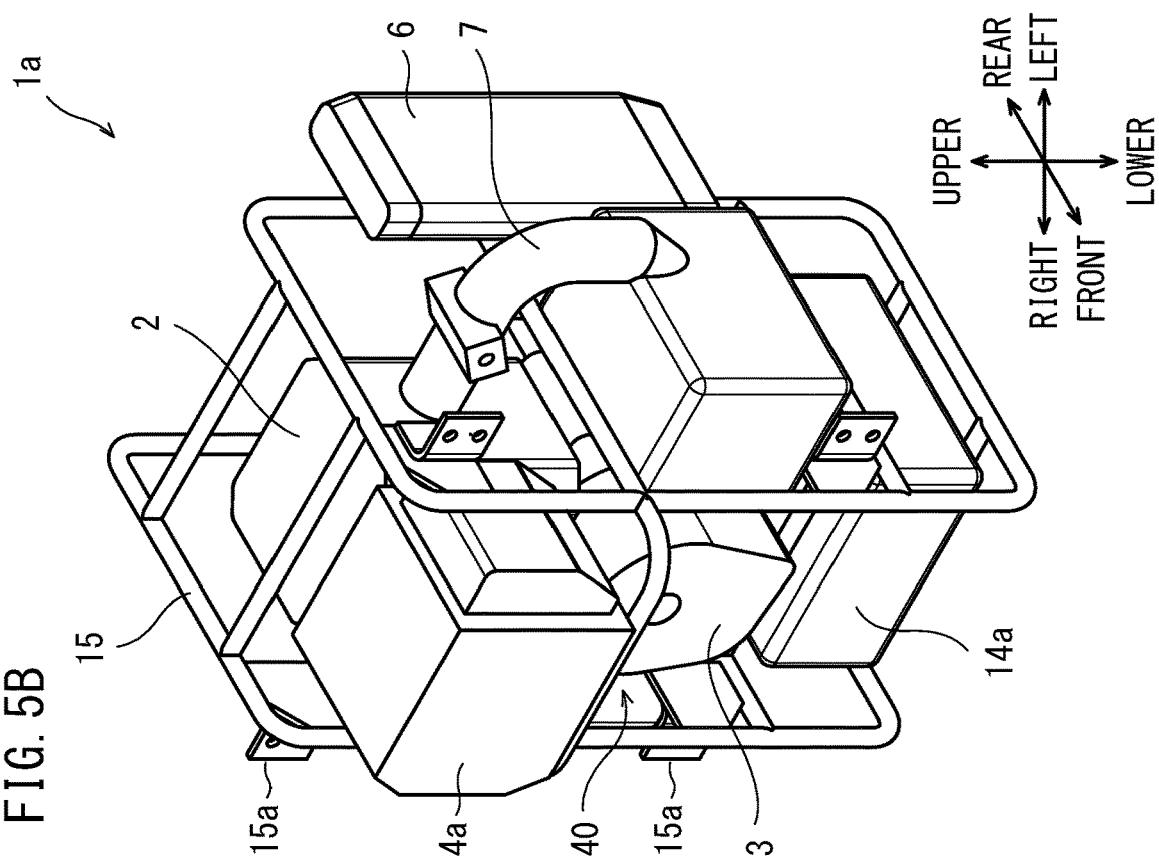
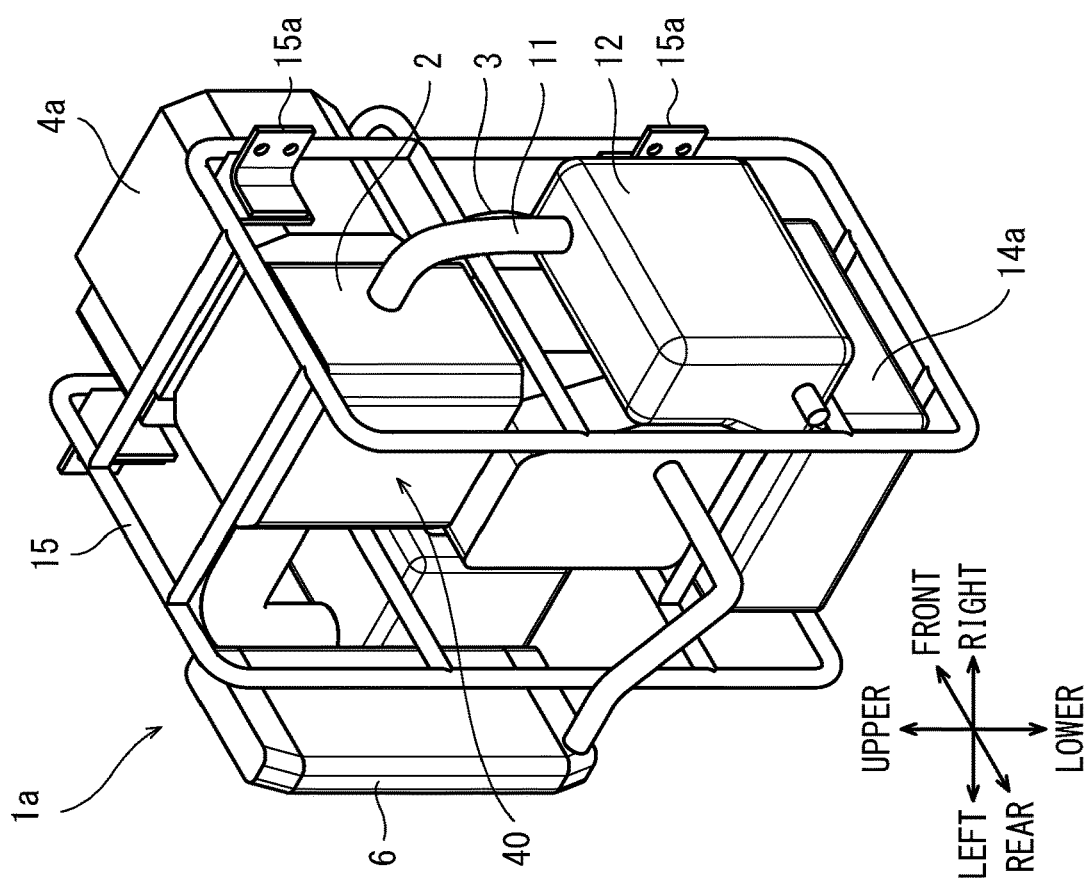

ENERGY GENERATOR AND ENERGY SUPPLY SYSTEM

TECHNICAL FIELD

The present disclosure relates to an energy generator and an energy supply system which supply power to working equipment.

BACKGROUND ART

Robots including batteries and driven by using electric power supplied from the batteries have been known (see PTL 1, for example). PTL 1 discloses a robot which includes a battery and a driving wheel and performs work at a production line while self-traveling by using electric power from the battery. According to the robot of PTL 1, when the amount of electric power remaining in the battery is small, the battery is charged at a charging station.

CITATION LIST

Patent Literature

PTL 1: International Publication No. 2016/103303

SUMMARY OF INVENTION

Technical Problem

However, since the robot disclosed in PTL 1 self-travels and performs work by using the electric power of the battery, a time in which the robot self-travels and performs work is limited. Moreover, when the electric power of the battery decreases, the battery needs to be charged at the charging station. Therefore, a place where the robot performs work is limited to a place close to the charging station.

An object of one aspect of the present disclosure is to provide an energy generator and an energy supply system which are mounted on mobile working equipment and can increase a work time and a travel distance.

Solution to Problem

An energy generator of the present disclosure is an energy generator which is mounted on mobile working equipment and supplies operating power, required for work, to the working equipment. The energy generator includes: an internal combustion engine; a power generator that is driven by the internal combustion engine to generate the operating power; a communication interface that receives information given from the working equipment; a supply interface that supplies the operating power to the working equipment; and circuitry configured to control at least one of the internal combustion engine and the power generator based on the information given from the working equipment through the communication interface.

The energy generator configured as above includes the internal combustion engine and the power generator that is driven by the internal combustion engine to generate the operating power. Therefore, since the energy obtained by combusting the fuel in the internal combustion engine is used, the amount of energy generated can be increased more than when only a battery is included. Thus, the work time of the working equipment which performs work by using the energy supplied from the energy generator can be increased, and the travel distance of the working equipment that moves can be increased.

Moreover, the circuitry can control the supply of the energy in accordance with the information from the working equipment. The state of the supply of the energy can be changed in accordance with the state of the working equipment, and the excess and insufficiency of the energy supply can be easily prevented.

An energy generator of the present disclosure is an energy generator which is mounted on mobile working equipment and supplies operating power, required for work, to the working equipment. The energy generator includes: an internal combustion engine; a power generator that is driven by the internal combustion engine to generate the operating power; a communication interface that receives information given from the working equipment; a supply interface that supplies the operating power to the working equipment; circuitry configured to control at least one of the internal combustion engine and the power generator based on the information given from the working equipment through the communication interface; an accommodating region that accommodates the internal combustion engine, the power generator, the communication interface, the supply interface, and the circuitry; and a support frame including an attaching portion which is attached to, detached from, and fixed to the working equipment. The support frame is located outside the accommodating region.

The energy generator configured as above includes: the accommodating region that accommodates the internal combustion engine, the power generator, the communication interface, the supply interface, and the circuitry; and the support frame including the attaching portion which is attached to, detached from, and fixed to the working equipment. Therefore, the internal combustion engine, the power generator, the communication interface, the supply interface, and the circuitry which are accommodated in the accommodating region are protected by the support frame. Thus, the safety of the energy generator can be improved.

An energy supply system of the present disclosure includes: mobile working equipment; and an energy generator that supplies operating power, required for work, to the working equipment. The energy generator includes: an internal combustion engine; a power generator that is driven by the internal combustion engine to generate the operating power; a communication interface that receives information given from the working equipment; a supply interface that supplies the operating power to the working equipment; circuitry configured to control at least one of the internal combustion engine and the power generator based on the information given from the working equipment through the communication interface; and an attaching portion attached to the working equipment. The working equipment includes an attached portion to which the attaching portion is attached.

In the energy supply system configured as above, the energy generator includes the attaching portion attached to the working equipment, and the working equipment includes the attached portion attached to the attaching portion. Therefore, the energy generator can be easily and surely attached to the working equipment.

An energy supply system of the present disclosure includes: mobile working equipment; and an energy generator that supplies operating power, required for work, to the working equipment. The energy generator includes: an internal combustion engine; a power generator that is driven by the internal combustion engine to generate the operating power; a supply interface that supplies the operating power to the working equipment; and generator circuitry configured to control at least one of the internal combustion engine and the power generator. The working equipment includes work circuitry configured to control the work of the working equipment. The generator circuitry and the work circuitry mutually perform communication of information. The generator circuitry controls at least one of the internal combustion engine and the power generator in the energy generator in accordance with the information received from the work circuitry. The generator circuitry transmits a command to the work circuitry to control the working equipment in accordance with information received from at least one of the internal combustion engine and the power generator.

In the energy supply system configured as above, the generator circuitry controls at least one of the internal combustion engine and the power generator in the energy generator in accordance with the information received from the work circuitry. Moreover, the generator circuitry transmits the command to the work circuitry to control the working equipment in accordance with the information received from at least one of the internal combustion engine and the power generator. Therefore, the generator circuitry can control both of the energy generator and the working equipment. Thus, the generator circuitry can flexibly control the energy generator and the working equipment in accordance with the situation.

Advantageous Effects of Invention

According to the present disclosure, the work time of the working equipment is increased, and the travel distance of the working equipment is increased. Therefore, an application range of the working equipment can be widened. For example, the working equipment can perform work which could not be performed before due to the limit of the amount of energy since the work requires time. Moreover, the working equipment can perform work at a place where the working equipment could not reach before.

Moreover, the energy can be appropriately supplied without excess or insufficiency. Therefore, a case where the working equipment cannot perform work due to the insufficiency of the supply energy can be prevented, and a case where the working equipment cannot perform work since the usable energy is completely consumed due to the excessive supply of the energy can be prevented. Therefore, the working equipment can perform more work.

BRIEF DESCRIPTION OF DRAWINGS

FIGS. 1A and 1B are perspective views each showing an energy generator according to Embodiment 1.

FIG. 2A is a side view showing that a robot on which the energy generator shown in FIGS. 1A and 1B is mounted is walking. FIG. 2B is a side view showing that the robot stands upright.

FIGS. 5A and 5B are perspective views each showing the energy generator according to Embodiment 2.

DESCRIPTION OF EMBODIMENTS

Embodiment 1

Figure 3:
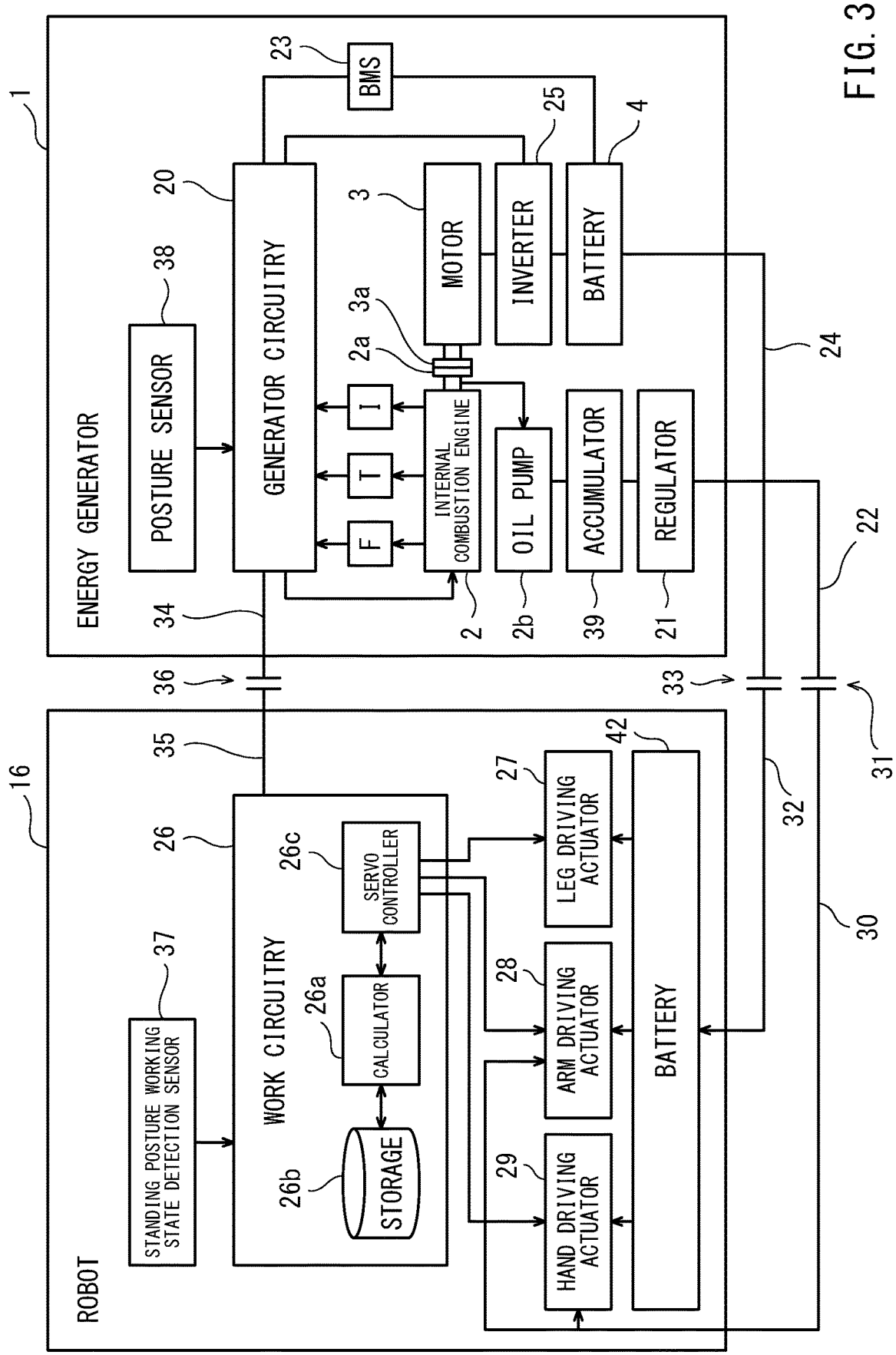
FIG. 3 is a block diagram showing a control system for the energy generator and the robot.

Hereinafter, an energy generator according to Embodiment 1 will be described with reference to the attached drawings. FIG. 1A is a perspective view showing an energy generator 1 according to Embodiment 1 which is viewed from a diagonally rear side. FIG. 1B is a perspective view showing the energy generator 1 which is viewed from a diagonally front side. Herein, the terms "front" and "rear" indicate directions based on a biped walking robot which carries the energy generator 1 on its back as described below. Moreover, "upper," "lower," "left," and "right" directions indicate directions viewed from the energy generator 1 which is carried by the biped walking robot on its back.

FIGS. 1A and 1B are perspective views each showing the energy generator 1 according to Embodiment 1. FIG. 1A is a perspective view showing the energy generator 1 which is viewed from a diagonally rear side. FIG. 1B is a perspective view showing the energy generator 1 which is viewed from a diagonally front side.

The energy generator 1 includes an internal combustion engine 2 and a motor (power generator) 3 that is driven by the internal combustion engine 2 to generate power. An output shaft 2a (FIG. 3) of the internal combustion engine 2 and an input shaft 3a (FIG. 3) of the motor 3 are coaxially connected to each other. In the present embodiment, when the internal combustion engine 2 drives, the output shaft 2a rotates, and the rotation of the output shaft is transmitted to the input shaft 3a of the motor 3. Thus, electric power is generated by the motor 3. In the present embodiment, the motor 3 operates mainly as a motor for electric power generation and serves as an electric generator that receives, through the input shaft, the rotation generated by the internal combustion engine 2 and generates the electric power. In the present embodiment, the internal combustion engine 2 and the motor 3 are lined up in a front-rear direction of the energy generator 1, and the motor 3 is located in front of the internal combustion engine 2. In other words, the internal combustion engine 2 and the motor 3 are lined up in a direction which is along a horizontal direction and in which the below-described energy generator 1 and a robot 16 are lined up, and the motor 3 is located closer to the robot 16 than the internal combustion engine 2.

Moreover, the energy generator 1 includes a battery 4. In the present embodiment, the battery 4 is located behind cylinders of the internal combustion engine 2. The battery 4 serves as energy storing equipment that stores electric energy generated by the motor 3. In the present embodiment, the battery 4 is located higher than the output shaft 2a (FIG. 3) of the internal combustion engine 2 and the input shaft 3a (FIG. 3) of the motor 3.

The internal combustion engine 2 includes intake-exhaust equipment 5 and a radiator 6 that cools a cooling liquid. The intake-exhaust equipment 5 includes intake equipment 9 and exhaust equipment 13. The intake equipment 9 includes an intake port (not shown), an intake duct 7, and an air cleaner 8. The exhaust equipment 13 includes an exhaust port 10, an exhaust duct 11, and a muffler 12. In the present embodiment, the intake equipment 9 is substantially located at a left side of the internal combustion engine 2 in a left-right direction. Moreover, in the present embodiment, the exhaust equipment 13 is substantially located at a right side of the internal combustion engine 2 in the left-right direction. As above, the energy generator 1 includes: an air intake structure by which air is taken in the internal combustion engine 2; and an air exhaust structure by which air is discharged from the internal combustion engine 2. Moreover, the energy generator 1 includes a structure that is necessary to cool and lubricate the internal combustion engine 2 and the motor 3. Herein, the left-right direction denotes a direction which is orthogonal to the front-rear direction along the horizontal direction and directed from an intake side of the intake-exhaust equipment 5 toward an exhaust side of the intake-exhaust equipment 5, or its opposite direction.

The air taken in through the intake port flows through an inside of the intake duct 7 into the internal combustion engine 2. At this time, since the air taken in through the intake port flows through the air cleaner 8, the air taken into the inside of the internal combustion engine 2 can be made clean. In the present embodiment, the air cleaner 8 is located in front of the radiator 6 and lower than the battery 4. Exhaust air discharged from the internal combustion engine 2 flows through the exhaust duct 11 and is discharged through the exhaust port 10 to an outside. At this time, since the exhaust air flows through the muffler 12, sound generated by the pulsation of the exhaust air can be reduced. The exhaust port 10 discharges the exhaust air from the muffler 12 toward a rear side of the energy generator 1. In the present embodiment, the muffler 12 is located at a position that is deviated in the right direction from the middle in the energy generator 1. Moreover, the radiator 6 is located at a position that is deviated in the left direction from the middle in the energy generator 1.

The cooling liquid can flow through an inside of the radiator 6. Moreover, a fan that introduces passing wind into the radiator 6 is located at the radiator 6. The air is introduced into the radiator 6 by the fan, and heat exchange between the cooling liquid and outside air is performed in the radiator 6. Thus, the cooling liquid can be cooled. The cooling liquid cooled by the radiator 6 is supplied to the internal combustion engine 2 and flows through the inside of the internal combustion engine 2. Thus, the internal combustion engine 2 can be cooled.

Moreover, the energy generator 1 includes a fuel tank 14 and a fuel pipe (not shown). The fuel tank 14 can store fuel, such as gasoline, which is used in the internal combustion engine 2. In the present embodiment, gasoline is used as the fuel in the fuel tank 14. The fuel stored in the fuel tank 14 can be supplied through the fuel pipe to the internal combustion engine 2. In the present embodiment, the fuel tank 14 is located higher than the output shaft 2a (FIG. 3) of the internal combustion engine 2 and the input shaft 3a (FIG. 3) of the motor 3. Since the fuel tank 14 is located higher than the output shaft 2a of the internal combustion engine 2 and the input shaft 3a of the motor 3 in the energy generator 1, the position of an oil supply port of the fuel tank 14 is also located higher than the output shaft 2a of the internal combustion engine 2 and the input shaft 3a of the motor 3 in the energy generator 1. Therefore, the oil supply port is located at such a position that when supplying the fuel to the fuel tank 14, such fuel supply is easily performed.

The motor 3 can start the internal combustion engine 2 by using the electric power stored in the battery 4. The motor 3 can rotate the output shaft 2a of the internal combustion engine 2 by rotating the input shaft 3a in a direction opposite to a rotational direction of the motor 3 when the motor 3 is used as an electric generator that is supplied with the electric power from the battery 4 and generates the electric power.

Thus, the motor 3 can start the internal combustion engine 2. As above, the motor 3 has both of the function of an electric generator that generates electric power and the function of a starter that starts the internal combustion engine 2. Therefore, the number of motors 3 required can be reduced, and the energy generator 1 can be reduced in size.

Moreover, the energy generator 1 includes a support frame 15. In the present embodiment, the internal combustion engine 2 and the motor 3 are supported by the support frame 15. Furthermore, in the present embodiment, the radiator 6 is supported by the support frame 15. In the present embodiment, the support frame 15 has a cubic frame shape. The support frame 15 serves as an outer shell of a structure that accommodates therein the internal combustion engine 2 and the motor 3. Therefore, the elements are integrally connected to each other through the support frame 15, and the energy generator 1 can stand by itself when the energy generator 1 is independently placed. In the present embodiment, the support frame 15 extends under the energy generator 1, and when the energy generator 1 stands by itself, the support frame 15 contacts a ground surface and supports the weight of the energy generator 1.

The support frame 15 includes attaching portions 15a which are used to attach, detach, or fix the support frame 15 to, from, or to working equipment, such as a below-described robot. By fixing the attaching portions 15a to the working equipment with, for example, screws, the support frame 15 is fixed to the working equipment. In the present embodiment, the intake-exhaust equipment 5, the radiator 6, and the motor 3 in the energy generator 1 are supported by the support frame 15.

Moreover, in the present embodiment, a region of the support frame 15 where the attaching portion 15a is located is referred to as an attaching region 15b, and a region of the support frame 15 other than the attaching region 15b is referred to as a non-attaching region 15c. In the present embodiment, the radiator 6 is attached to the non-attaching region 15c of the support frame 15. Furthermore, in the present embodiment, the radiator 6 is located outside the support frame 15 in the left-right direction. The radiator 6 is attached to and supported by the support frame 15 at a position located outside, in the left-right direction, a region surrounded by the support frame 15 having the cubic frame shape. In the present embodiment, the radiator 6 is located at the left side of the battery 4.

In the present embodiment, the internal combustion engine 2 and the motor 3 in the energy generator 1 are located inside the region surrounded by the support frame 15. Moreover, in the present embodiment, the support frame 15 is formed in a frame shape by a metal pipe and can protect the inside of the region surrounded by the support frame 15. Therefore, the internal combustion engine 2 and the motor 3 are protected inside the support frame 15.

Moreover, a region of the support frame 15 where the radiator 6 is supported is referred to as a radiator support region 15d. The exhaust equipment 13 is located at such a position that the exhaust air is discharged to an outside through a region which is different from the radiator support region 15d and the attaching region 15b. In the present embodiment, the exhaust equipment 13 is located at an opposite side of the radiator 6 in the left-right direction of the energy generator 1. In the present embodiment, the muffler 12 is located at an opposite side of the radiator 6, and the exhaust port 10 projects rearward from the muffler 12. The exhaust air from the internal combustion engine 2 is discharged rearward through the exhaust port 10.

The energy generator 1 can be mounted on a mobile robot. In the present embodiment, the mobile robot is the working equipment that can stand upright with two legs, perform bipedal locomotion, and perform work at a destination.

In the present specification, the working equipment is equipment that can self-travel from a predetermined start position and work at a work position located away from the start position. The working equipment includes an interface that can be connected to the energy generator 1 to receive energy generated by the energy generator 1. Moreover, the working equipment includes an actuator that receives and is driven by the energy generated by the energy generator 1 in order that the working equipment moves and performs work. The working equipment can be made to work in place of a human by using the energy generated by the energy generator 1. Since the working equipment is made to work, the work can be performed by larger force than a human. Furthermore, the working equipment can exchange information with the energy generator 1 through the interface.

FIG. 2A is a side view showing that the robot (working equipment) 16 on which the energy generator 1 is mounted is walking. FIG. 2A is a side view showing the robot 16 which is viewed from the left side. The robot 16 includes two legs 17 and can move with the legs 17 by bipedal locomotion. The legs 17 include respective ground contact surfaces 17a that contact a ground surface.

The robot 16 includes a movement actuator that is an actuator for movement. In the present embodiment, the robot 16 moves by bipedal locomotion. Therefore, in the present embodiment, a leg driving actuator that drives the two legs 17 corresponds to the movement actuator for movement work. A front direction that is a direction in which the robot 16 advances by bipedal locomotion is shown by an arrow D1. The leg driving actuator is driven by the energy generated by the energy generator 1. In the energy generator 1 of the present embodiment, the motor 3 is rotated by the internal combustion engine 2 to generate the electric energy, and an oil pump 2b is rotated by the internal combustion engine 2 to apply pressure energy to operating oil. Therefore, the leg driving actuator is driven by the electric energy or the pressure energy.

FIG. 2B is a side view showing that the robot 16 on which the energy generator 1 is mounted stands upright. FIG. 2B is a side view showing the robot 16 which is viewed from the left side. As shown in FIGS. 2A and 2B, the energy generator 1 is mounted on the robot 16 in such a way that the robot 16 carries the energy generator 1 on its back. To be specific, with the energy generator 1 mounted on the robot 16, the robot 16 is located in front of the energy generator 1 when viewed from the energy generator 1. When the robot 16 is in an upright state, the energy generator 1 is located at a position away from a vertical region A1, which extends vertically upward from the ground contact surface 17a, in a direction orthogonal to a vertical direction. In the present embodiment, the energy generator 1 is located at a position away from the vertical region A1 toward the rear side of the robot 16, i.e., in a direction opposite to the direction D1 that is an advancing direction in which the robot 16 walks and advances forward.

Moreover, the robot 16 includes additional actuators as actuators that perform additional work different from the movement. In the present embodiment, for example, two hands 18 and two arms 19 perform the additional work different from the movement. Therefore, a hand driving actuator that drives the two hands 18 and an arm driving actuator that drives the two arms 19 correspond to the additional actuators. The hand driving actuator and the arm driving actuator are driven by power generated by the energy generator 1. To be specific, the hand driving actuator and the arm driving actuator are driven by electric power energy which is generated by the motor 3 driven by the internal combustion engine 2 or pressure energy of the operating oil which is generated by the below-described oil pump 2b driven by the internal combustion engine 2.

As shown in FIG. 2, when the support frame 15 is fixed to the robot 16 by the attaching portions 15a, the energy generator 1 is supported by the robot 16. Therefore, the internal combustion engine 2 and the motor 3 are supported by the robot 16 through the support frame 15.

The robot 16 includes attached portions 41 to which the attaching portions 15a are attached. In the present embodiment, the attaching portions 15a of the energy generator 1 and the attached portions 41 of the robot 16 are fastened to each other with screws. Thus, the support frame 15 is fixed to the robot 16, and the energy generator 1 is supported by the robot 16. The attaching portions 15a of the energy generator 1 and the attached portions 41 of the robot 16 may be attached to each other by another method other than the screws.

When the energy generator 1 is supported by the robot 16, the energy generator 1 is located behind the back of the robot 16 and is carried by the robot 16 on its back. Therefore, when the robot 16 falls backward, the energy generator 1 may collide with the ground surface. In the present embodiment, the internal combustion engine 2 and the motor 3 are surrounded by the support frame 15 from an outside. Therefore, even when the energy generator 1 collides with the ground surface, the internal combustion engine 2 and the motor 3 are protected by the support frame 15.

When the energy generator 1 is mounted on the robot 16, the energy generator 1 and the robot 16 can exchange driving power and information. FIG. 3 is a block diagram showing a control system for the energy generator 1 and the robot 16.

When the energy generator 1 is mounted on the robot 16, the support frame 15 serves as a portion through which the energy generator 1 mounted on the robot 16 is supported by the robot 16. With the energy generator 1 mounted on the robot 16, the energy generator 1 is carried by the robot 16 on its back, and the exhaust port 10 of the internal combustion engine 2 is directed to the rear side of the robot 16. Therefore, high-temperature exhaust gas discharged from the internal combustion engine 2 can be prevented from being discharged toward the robot 16. Thus, the robot 16 can be prevented from becoming high in temperature. Moreover, in the present embodiment, the muffler 12 is located at a position that is deviated in the right direction from the middle in the energy generator 1 and is separated rearward from the attaching portions 15a of the support frame 15, and the radiator 6 is located at a position that is deviated in the left direction from the middle in the energy generator 1 and is separated rearward from the attaching portions 15a of the support frame 15. Therefore, with the energy generator 1 mounted on the robot 16, heat from the muffler 12 and the radiator 6 can be prevented from being transferred to the robot 16. Thus, the robot 16 can be prevented from becoming high in temperature.

The energy generator 1 includes generator circuitry (circuitry) 20 configured to control operation of the energy generator 1. The generator circuitry 20 can send signals to the internal combustion engine 2. The rotation output from the output shaft 2a is controlled in accordance with the signal from the generator circuitry 20. Therefore, the generator circuitry 20 can control the driving of the internal combustion engine 2.

Various sensors that detect information regarding states of the internal combustion engine 2 are located at the internal combustion engine 2. The information regarding the states of the internal combustion engine 2 can be obtained by using the sensors. At least part of the information obtained by the sensors is transmitted to the generator circuitry 20, and therefore, the generator circuitry 20 can control the operation of the internal combustion engine 2 in accordance with the states of the internal combustion engine 2. In the present embodiment, for example, a fuel sensor F, an ignition sensor I, and an air flow sensor T are used as the sensors that detect the states of the internal combustion engine 2. The fuel sensor F can detect the pressure of the fuel when the fuel is injected. Moreover, the ignition sensor I can detect the timing of ignition in the internal combustion engine 2. Furthermore, the air flow sensor T can detect the flow rate of intake air taken in by the internal combustion engine 2. In accordance with the detection results of these sensors, factors, such as fuel injection performed by an injector, ignition performed by a spark plug, and a throttle opening, are controlled, and an air-fuel ratio and output are adjusted. Thus, the operation of the internal combustion engine 2 is controlled. At this time, for example, the injector, the spark plug, and a throttle valve function as specific actuators of the internal combustion engine 2.

Moreover, the internal combustion engine 2 may include sensors, such as: a fuel remaining amount sensor that detects the amount of fuel stored in the fuel tank 14; an intake air pressure sensor that detects the pressure of the intake air taken in through the intake port; an engine temperature sensor that detects the temperature of the internal combustion engine 2; an exhaust gas sensor, such as an $O_2$ sensor, which detects components of the exhaust gas discharged from the exhaust port 10; an engine rotational frequency sensor that detects the rotational frequency of the output shaft 2a of the internal combustion engine 2; and an abnormal state sensor that detects the abnormality or deterioration of an electric component and the like of the internal combustion engine 2. The operation of the internal combustion engine 2 may be controlled in accordance with the detection results of these sensors.

The internal combustion engine 2 includes the oil pump 2b. Part of the rotation of the output shaft 2a of the internal combustion engine 2 is transmitted to the oil pump 2b, and therefore, the operating oil can be supplied to the robot 16 through the oil pump 2b. A pipe 22 extending from the oil pump 2b for the operating oil is connected to an accumulator 39. Moreover, the pipe 22 extending from the accumulator 39 for the operating oil is connected to a regulator 21. The pipe 22 extending from the regulator 21 is connected to the robot 16. Pressure oil from the oil pump 2b can be supplied to the robot 16 through the pipe 22, the accumulator 39, and the regulator 21.

Since the pipe 22 extending from the oil pump 2b for the operating oil is connected to the accumulator 39, the operating oil to which pressure is given by the driving of the oil pump 2b can be stored in the accumulator 39. The operating oil stored in the accumulator 39 can be supplied to the robot 16. Therefore, the operating oil having the pressure that is high to some extent can be supplied to the robot 16.

Moreover, since the pipe 22 extending from the oil pump 2b is connected to the robot 16 through the regulator 21, the operating oil having hydraulic pressure that has been set by the regulator 21 in accordance with a command from the robot 16 is supplied to the robot 16. Therefore, the hydraulic pressure of the operating oil supplied to the robot 16 can be set more accurately. Thus, the operating oil having more accurate hydraulic pressure can be supplied to the robot 16.

In the present embodiment, lubricating oil can flow inside the internal combustion engine 2. To be specific, the lubricating oil flows inside the internal combustion engine 2 by the driving of the oil pump 2b. A component that supplies energy to the lubricating oil in order that the lubricating oil flows inside the internal combustion engine 2 does not have to be the oil pump 2b. For example, in addition to the oil pump 2b which supplies the operating oil to the hand driving actuator that drives the two hands 18 of the robot 16 and the arm driving actuator that drives the two arms 19 of the robot 16 and supplies the pressure energy to the hand driving actuator and the arm driving actuator, another oil pump may be located at the internal combustion engine 2, and the lubricating oil may flow inside the internal combustion engine 2 by the driving of the another oil pump.

The motor 3 is connected to the battery 4 through an electric power cable. Therefore, the electric power generated by the motor 3 can be supplied to the battery 4. The electric power supplied to the battery 4 is temporarily stored in the battery 4. Moreover, the generator circuitry 20 is connected to the battery 4 through a battery management system (BMS) 23. Therefore, the generator circuitry 20 can control, through the BMS 23, the supply of the electric power from the battery 4 to the robot 16.

Moreover, an inverter 25 is located between the motor 3 and the battery 4. Furthermore, the inverter 25 is connected to the generator circuitry 20. Therefore, the inverter 25 can adjust the electric power supplied from the motor 3 to the battery 4.

The battery 4 can supply the electric power to the robot 16 through the electric power cable 24. Therefore, the generator circuitry 20 can supply the electric power from the battery 4 to the robot 16 while controlling the electric power.

The robot 16 includes work circuitry 26 configured to control the movement work of the robot 16 which is performed by the movement actuator and the additional work of the robot 16 which is performed by the additional work actuator.

The work circuitry 26 of the robot 16 includes a calculator 26a, a storage 26b, and a servo controller 26c. The work circuitry 26 is a robot controller including a computer, such as a microcontroller. The work circuitry 26 may be a piece of work circuitry 26 that performs centralized control or may include pieces of work circuitry 26 that cooperate to perform distributed control.

The storage 26b stores information, such as a basic program as the robot controller and various fixed data. The calculator 26a controls various operations of the robot 16 by reading and executing software, such as the basic program, stored in the storage 26b. To be specific, the calculator 26a generates a control command of the robot 16 and outputs the control command to the servo controller 26c. For example, the calculator 26a includes a processor unit.

The servo controller 26c controls the driving of the movement actuator and the driving of the additional actuator based on the control command generated by the calculator 26a.

In the present embodiment, the servo controller 26c of the work circuitry 26 is connected to a leg driving actuator 27 serving as the movement actuator. Therefore, the work circuitry 26 can control the driving of the leg driving actuator 27 to control the movement of the robot 16 that moves with the legs 17 by the bipedal locomotion. Moreover, the servo controller 26c of the work circuitry 26 is connected to a hand driving actuator 29 and a leg driving actuator 27 which serve as the additional actuators. Therefore, the work circuitry 26 can control the driving of the arm driving actuator 28 and the driving of the hand driving actuator 29 to control the additional work performed by using the hands 18 and the arms 19 of the robot 16.

The pipe 22 for the pressure oil supplied from the oil pump 2b through the regulator 21 to the robot 16 in the energy generator 1 is connected to a pipe 30 of the robot 16 through a pressure oil supply interface 31. The pressure oil supply interface 31 is detachably connected. The pipe 30 of the robot 16 is connected to the arm driving actuator 28 and the hand driving actuator 29. Since the pressure oil from the oil pump 2b can be supplied through the pressure oil supply interface 31 to the pipe 30 of the robot 16, operating power generated by the hydraulic pressure can be supplied to the arm driving actuator 28 and the hand driving actuator 29. As above, the pressure energy can be generated by the driving of the oil pump 2b and supplied to the arm driving actuator 28 and the hand driving actuator 29 through the pressure oil supply interface 31. At this time, the oil pump 2b serves as a power generator that generates the pressure energy by the driving of the internal combustion engine 2.

The electric power cable 24 extending from the battery 4 to the robot 16 in the energy generator 1 is connected to an electric power cable 32 of the robot 16 through an electric power supply interface 33. The electric power supply interface 33 is detachably connected. The electric power cable 32 of the robot 16 is connected to a battery 42 of the robot 16. The electric power cable 32 extending from the battery 42 is connected to the leg driving actuator 27, the arm driving actuator 28, and the hand driving actuator 29. Since the electric power from the battery 4 of the energy generator 1 can be supplied through the electric power supply interface 33 to the electric power cable 32 of the robot 16, the operating power generated by the electric power can be supplied through the battery 42 of the robot 16 to the leg driving actuator 27, the arm driving actuator 28, and the hand driving actuator 29.

The energy generator 1 is mounted on the robot 16 in such a way that the robot 16 carries the energy generator 1 on its back, and the energy is supplied from the mounted energy generator 1 to the robot 16. Therefore, for example, it is unnecessary to supply the electric energy to the robot 16 through a cable from a power supply located at a predetermined position. The energy for driving the robot 16 does not have to be supplied through a cable. Therefore, a movement range of the robot 16 can be made larger than when the energy is supplied to the robot 16 through a cable. Moreover, when the robot 16 performs work, the cable does not have to be in connection with the robot 16. Therefore, the cable does not interfere with the robot 16, and this can improve the degree of freedom of the work of the robot 16 at a workplace.

In the present embodiment, the pressure energy of the pressure oil which is generated by the energy generator 1 is transmitted to the robot 16 through the pressure oil pipe 30 and the pressure oil supply interface 31. Therefore, in the robot 16, it is unnecessary to generate the pressure energy which drives the actuators. Moreover, in the present embodiment, the electric power energy generated by the energy generator 1 is transmitted to the robot 16 through the electric power cable 32 and the electric power supply interface 33. Therefore, in the robot 16, it is unnecessary to generate the electric power energy which drives the actuators.

Thus, in the present embodiment, the robot 16 does not include a device, such as an internal combustion engine, which generates power. Therefore, the robot 16 does not include an intake-exhaust mechanism, and intake air is not introduced into the robot 16. Moreover, exhaust air is not discharged from the robot 16. Since the robot 16 does not include a device, such as an internal combustion engine, which generates power, a cooling liquid that flows in the device to cool the device and a lubricating liquid that lubricates the device do not flow in the robot 16. In the present embodiment, the radiator 6 is located at the energy generator 1 mounted on the robot 16 and cools the cooling liquid flowing inside the internal combustion engine 2. Moreover, in the present embodiment, the oil pump 2b is located at the energy generator 1 mounted on the robot 16, and the lubricating oil flows inside the internal combustion engine 2 by the driving of the oil pump 2b.

Moreover, in the present embodiment, since the energy generator 1 including the internal combustion engine 2 is mounted on the robot 16, the robot 16 does not include a heat generating element that generates power. Therefore, the robot 16 does not have to include a component that generates energy. Accordingly, since it is unnecessary to generate heat inside the robot 16, the robot 16 does not have to include a heat resistant structure. Since an increase in the number of parts for heat resistance in the robot 16 can be suppressed, the configuration of the robot 16 can be simplified.

A communication cable 34 extends from the generator circuitry 20 of the energy generator 1 toward the robot 16. A communication cable 35 extends from the work circuitry 26 of the robot 16 toward the energy generator 1.

The communication cable 34 of the energy generator 1 and the communication cable 35 of the robot 16 are connected to each other through a communication interface 36. In the present embodiment, the communication cable 34 as an actual cable and the communication cable 35 as an actual cable are connected to each other through the communication interface 36 as a connector. The communication interface 36 can switch between a connected state and a cut state. After the energy generator 1 is attached to the robot 16, the communication interface 36 is set to the connected state, and the generator circuitry 20 of the energy generator 1 can receive information from the work circuitry 26 of the robot 16 through the communication interface 36. When the energy generator 1 is detached from the robot 16, the communication interface 36 becomes the cut state. After the energy generator 1 is attached to the robot 16, the communication interface 36 may automatically become the connected state, and the information from the work circuitry 26 may be able to be transmitted to the generator circuitry 20.

Moreover, in the present embodiment, the internal combustion engine 2, the motor 3, the communication interface, the electric power supply interface 33, the pressure oil supply interface 36, and the generator circuitry 20 are accommodated inside the support frame 15. In the present embodiment, a region which is located inside the support frame 15 and accommodates the internal combustion engine 2, the motor 3, the communication interface, the electric power supply interface 33, the pressure oil supply interface 36, and the generator circuitry 20 is referred to as an accommodating region 40. Therefore, the support frame 15 is located outside the accommodating region 40.

The generator circuitry 20 controls the internal combustion engine 2 based on information given from the robot 16 through the communication interface 36. The generator circuitry 20 can transmit signals regarding operation to the internal combustion engine 2. Moreover, in accordance with an output required for the work of the robot 16, the generator circuitry 20 can transmit, to the internal combustion engine 2, the signal regarding the operation corresponding to the output of the robot 16. The rotation output from the output shaft 2a is controlled in accordance with the signal from the generator circuitry 20. To be specific, the generator circuitry 20 can control the internal combustion engine 2 based on information regarding the leg driving actuator 27 (movement actuator) and information regarding the hand driving actuator 29 and the arm driving actuator 28 (additional actuators) which are received from the work circuitry 26. For example, the generator circuitry 20 can control the internal combustion engine 2 based on information regarding the leg driving actuator 27, information regarding the hand driving actuator 29, and information regarding the arm driving actuator 28 which correspond to outputs of the leg driving actuator 27, the hand driving actuator 29, and the arm driving actuator 28 which are required for the work of the robot 16.

When the generator circuitry 20 controls the internal combustion engine 2 based on the information given from the robot 16, the generator circuitry 20 may control the internal combustion engine 2 based on any of the electric energy required by the robot 16 and the pressure energy required by the robot 16. When the generator circuitry 20 controls the internal combustion engine 2 in accordance with the electric energy required by the robot 16, the generator circuitry 20 controls the internal combustion engine 2 in order that the motor 3 generates an amount of electric energy which is required when the robot 16 drives the actuators to perform work. Moreover, when the generator circuitry 20 controls the internal combustion engine 2 in accordance with the pressure energy required by the robot 16, the generator circuitry 20 controls the internal combustion engine 2 such that the hydraulic pressure and amount of the operating oil to be supplied to the actuators are appropriate for a response speed and an output which are required for the work of the robot 16.

Moreover, when the robot 16 performs work in a self-standing state, the generator circuitry 20 controls the internal combustion engine 2 based on information indicating a working state of the robot 16 in a self-standing posture. The robot 16 includes, for example, a self-standing posture working state detection sensor 37 that detects the working state of the robot 16 in the self-standing posture. Information indicating the working state of the robot 16 which is detected by the self-standing posture working state detection sensor 37 is transmitted to the generator circuitry 20, and the generator circuitry 20 controls the internal combustion engine 2 based on the information indicating the working state of the robot 16. For example, when the robot 16 performs work in an unstable state, such as a state in which the robot 16 stands on one leg, the internal combustion engine 2 may be controlled such that the generator circuitry 20 increases the output of the internal combustion engine 2 to increase the electric power supplied from the battery 4 to the leg driving actuator 27, and therefore, the robot 16 can stand firm by larger force of the legs 17.

Moreover, the generator circuitry 20 can control the output of the internal combustion engine 2 in accordance with the output required by the robot 16. Therefore, the generator circuitry 20 can make the energy generator 1 generate the energy the amount of which is not excessive and not insufficient with respect to the amount of energy required for the work of the robot 16. Thus, the insufficiency of the amount of energy generated by the internal combustion engine 2 can be suppressed, and a state in which the robot 16 cannot perform work due to the insufficiency of the energy to be generated can be suppressed. Furthermore, since the amount of fuel wastefully consumed by the internal combustion engine 2 can be suppressed, an increase in operation cost of the robot 16 can be suppressed. Moreover, since the fuel can be efficiently used, a work time of the robot 16 which is realized by filling the fuel tank 14 with the fuel once can be increased. Therefore, the amount of work performed per unit amount of fuel can be increased, and the total amount of work performed by the robot 16 using a fixed amount of fuel can be increased. Furthermore, when the robot 16 performs a predetermined amount of work, the number of times of fuel supply to the fuel tank 14 can be reduced, and therefore, the loss of the work of the robot 16 which is caused when the robot 16 cannot perform work during a time necessary for the fuel supply can be suppressed.

When the robot 16 uses up the fuel in the fuel tank 14, the energy generator 1 may be replaced with a new energy generator including the fuel tank 14 filled with the fuel, instead of supplying the fuel to the fuel tank 14. In the present embodiment, when the energy generator 1 is attached to the robot 16 by the attaching portions 15a of the support frame 15, and the electric power supply interface 33, the pressure oil supply interface 31, and the communication interface 36 are set to the connected state between the robot 16 and the energy generator 1, the energy generator 1 can be connected to the robot 16. Therefore, the energy generator 1 can be easily connected to the robot 16. Thus, by replacing the energy generator with a new energy generator after the fuel is used up, the work can be restarted in a short period of time.

The present embodiment has described a case where the generator circuitry 20 controls the internal combustion engine 2. However, the present embodiment is not limited to this. The generator circuitry 20 may control the motor 3 to control the electric power energy generated by the motor 3. Moreover, the generator circuitry 20 may control both the internal combustion engine 2 and the motor 3.

Moreover, in the present embodiment, the energy generator 1 includes a posture sensor 38 that can detect information regarding the posture of the energy generator 1. For example, an inertial measurement unit (IMU) or a pendulum sensor may be used as the posture sensor 38. The posture sensor 38 can detect whether or not the inclination of the energy generator 1 is equal to or more than a predetermined inclination limit. For example, when the posture sensor 38 detects that the inclination of the energy generator 1 is equal to or more than the predetermined inclination limit, the generator circuitry 20 controls the internal combustion engine 2 to stop the operation of the internal combustion engine 2. When the inclination of the internal combustion engine 2 is equal to or more than the predetermined inclination limit, problems, such as a problem that the lubricating oil does not reach the entire internal combustion engine 2, occur, and this may influence the operation of the internal combustion engine 2. Therefore, when the posture sensor 38 detects that the inclination of the energy generator 1 is equal to or more than the predetermined inclination limit, the generator circuitry 20 controls the internal combustion engine 2 to stop the operation of the internal combustion engine 2 such that the inclination of the internal combustion engine 2 is prevented from becoming equal to or more than the predetermined inclination limit. As above, the generator circuitry 20 determines a posture state of the energy generator 1 and performs control corresponding to the posture state determined based on a predetermined condition.

As described above, in the present embodiment, the connections between the energy generator 1 and the robot 16 include: a connection regarding a mechanical fixing structure for support; a connection regarding an energy supply passage through which the electric energy or the operating oil pressure energy is exchanged between the energy generator 1 and the robot 16; and a connection for information transmission and reception between the energy generator 1 and the robot 16.

Figure 4:
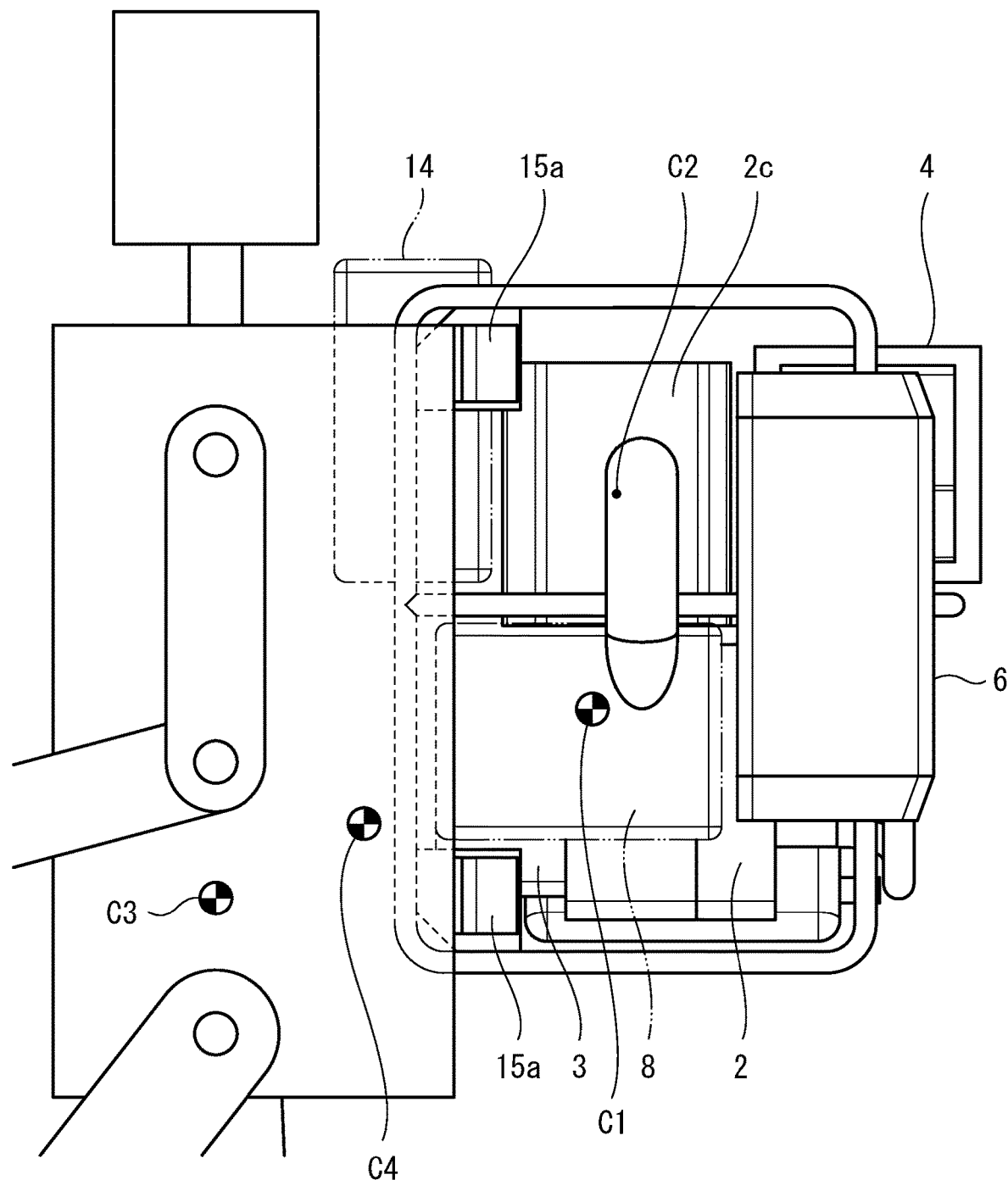
FIG. 4 is an enlarged side view showing the energy generator of FIG. 2A and its vicinity.

FIG. 4 is an enlarged side view showing the energy generator 1 and its vicinity. For explanation, in FIG. 4, the fuel tank 14 and the air cleaner 8 are shown by one-dot chain lines, and the internal combustion engine 2 is shown by solid lines.

In FIGS. 2 and 4, the center of gravity of the energy generator 1 is shown by C1, and a center of all cylinders 2c in the internal combustion engine 2 is shown by C2. Moreover, the center of gravity of the robot 16 itself is shown by C3. Furthermore, the center of gravity of an entire configuration including the robot 16 and the energy generator 1 mounted on the robot 16 is shown by C4. In the internal combustion engine 2 of the present embodiment, the cylinders 2c extending in the upper-lower direction are lined up in one row. The intake duct 7 is located at the left side of the cylinders 2c, and the exhaust duct 11 is located at the right side of the cylinders. Since the intake duct 7 and the exhaust duct 11 are located at both lateral sides of the cylinders 2c extending in the upper-lower direction, spaces at the lateral sides of the cylinders 2c can be efficiently used. Therefore, the energy generator 1 can be reduced in size. In the present embodiment, the center of gravity C1 of the energy generator 1 is located at a position closer to the attaching portion 15a, by which the energy generator 1 is attached to the robot 16, than the center C2 of all the cylinders 2c in the internal combustion engine 2.

In the energy generator 1 of the present embodiment, the fuel tank 14 that is relatively heavy is located at a position relatively close to the attaching portions 15a. Therefore, the energy generator 1 is configured such that the center of gravity C1 of the energy generator 1 is located at a front side. Thus, in the present embodiment, the center of gravity C1 of the energy generator 1 is located at a position closer to the attaching portion 15a than the center C2 of all the cylinders 2c in the internal combustion engine 2. Herein, when the number of rows, in the front-rear direction, of the cylinders 2c of the internal combustion engine 2 which are lined up in the left-right direction is an odd number, the center C2 of all the cylinders 2c in the internal combustion engine 2 is a center of the cylinder located at a middle in the front-rear direction. When the number of rows, in the front-rear direction, of the cylinders 2c of the internal combustion engine 2 which are lined up in the left-right direction is an even number, the center C2 of all the cylinders 2c in the internal combustion engine 2 is a middle position between two cylinders located at the middle. Specifically, when the cylinders 2c are lined up in a row in the left-right direction, the number of cylinders 2c in the front-rear direction is one. Therefore, the center C2 is a center of the cylinder 2c. Moreover, when the cylinders 2c of the internal combustion engine 2 are lined up in the front-rear direction, the center 2C is a front-rear direction center of the cylinders 2c lined up in the front-rear direction. Since the center of gravity C1 of the energy generator 1 is located at a position closer to the attaching portion 15a than the center C2 of all the cylinders 2c, the center of gravity C1 of the energy generator 1 is located close to the center of gravity C3 of the robot 16. Therefore, when the energy generator 1 is attached to the robot 16, the robot 16 hardly falls and can stably stand by itself.

If the center of gravity of the energy generator 1 is located at a position relatively away in a rear direction from the center of gravity of the robot 16, a large inertial moment acts on the robot 16 by downward gravity of the energy generator 1. Therefore, the robot 16 may easily fall by the inertial moment and become unstable. On the other hand, in the present embodiment, since the center of gravity C1 of the energy generator 1 is located at a position close to the robot 16, the inertial moment acting on the robot 16 by the weight of the energy generator 1 can be reduced. Therefore, the robot 16 hardly falls.

When the energy generator 1 is mounted on the robot 16, the center of gravity of the robot 16 moves from C3 to C4 as shown in FIGS. 2 and 4. When the center of gravity moves, load acting on the leg driving actuator that drives the legs 17 when the robot 16 moves or performs work changes. Therefore, the amount of energy required by the leg driving actuator changes. In the present embodiment, when the energy generator 1 is mounted on the robot 16, and the communication cable 35 of the robot 16 and the communication cable 34 of the energy generator 1 are connected to each other through the communication interface 36, the work circuitry 26 of the robot 16 can detect it. When the work circuitry 26 recognizes that the energy generator 1 is connected to the robot 16, the work circuitry 26 determines that the center of gravity has moved from C3 to C4. Then, the work circuitry 26 supplies to the actuators the energy, the amount of which corresponds to the movement of the center of gravity, to drive the robot 16. For example, when the robot 16 moves by walking, the work circuitry 26 supplies the energy, the amount of which corresponds to the center of gravity, to the leg driving actuator to drive the legs 17.

According to the above configuration, the driving of the internal combustion engine 2 is transmitted to the motor 3, and the energy generated by the motor 3 is supplied to the robot 16. The internal combustion engine 2 is driven by using the energy generated by the combustion of the fuel, such as gasoline, having high energy density, and the energy is supplied to the robot 16. Therefore, the amount of energy that can be used at the workplace can be increased more than when only a battery is included, and the energy stored in the battery is simply supplied. Thus, the work time and travel distance of the robot 16 at a specific place can be increased. Therefore, the robot 16 can perform work at the workplace for a longer period of time, and more effects can be obtained by the work. For example, when the robot 16 is used for lifesaving at a place where it is difficult for people to go in and out, the robot 16 can save more human lives by performing work for a long period of time.

Moreover, the generator circuitry 20 controls the supply of the energy to the robot 16 in accordance with the information from the robot 16. Therefore, the state of the energy supply can be changed in accordance with the state of the robot 16, and the excess and insufficiency of the energy supply can be easily prevented. Since the excess of the energy supply to the robot 16 can be prevented, the consumption amount of the energy is suppressed, and therefore, the consumption of the fuel can be suppressed small. Thus, the operation cost of the robot 16 can be reduced. The information from the robot 16 may be, for example, information which is detected when the robot 16 performs work, indicates the amount of energy required for the work, and is transmitted from the robot 16 to the energy generator 1. Moreover, the information from the robot 16 may be energy supply request information which is sent from the robot 16 to the energy generator 1 in accordance with the amount of energy required for work. The energy supply request information may be, for example, command information which commands the electric power generation amount to the energy generator 1 in accordance with next expected energy consumption.

Moreover, the generator circuitry 20 controls the driving of the internal combustion engine 2 and the generation of the electric power by the motor 3 based on information regarding the leg driving actuator 27 that performs the movement work of the robot 16 and information regarding the hand driving actuator 29 and the arm driving actuator 28 which perform, at a destination, the additional work different from the movement work. Therefore, the generation of the energy supplied to the robot 16 can be controlled based on the use of the leg driving actuator 27, the hand driving actuator 29, and the arm driving actuator 28. Thus, the energy supply to the robot 16 can be performed without excess or insufficiency.

The information regarding the leg driving actuator 27 is, for example, information regarding the amount of energy required when the robot 16 moves to a predetermined position by driving the leg driving actuator 27. Moreover, the information regarding the hand driving actuator 29 and the arm driving actuator 28 is, for example, information regarding the amount of energy required when the robot 16 performs predetermined work by driving the hand driving actuator 29 and the arm driving actuator 28. The generator circuitry 20 may control the driving of the internal combustion engine 2 and the generation of the electric power by the motor 3 based on the information regarding the energy required to drive the movement actuator and the information regarding the energy required to drive the additional actuators.

Moreover, the generator circuitry 20 controls the driving of the internal combustion engine 2 and the generation of the electric power by the motor 3 based on the information indicating the working state of the robot 16 in the self-standing posture. Therefore, the generator circuitry 20 can control the generation of the energy to be supplied to the robot 16 in accordance with the posture of the robot 16. Thus, the energy supply to the robot 16 can be performed without excess or insufficiency.

The information indicating the working state of the robot 16 in the self-standing posture is, for example, information indicating whether or not the robot 16 is performing work in an unstable state, such as a state in which the robot 16 stands on one leg. For example, when the robot 16 is performing work in an unstable state, the generator circuitry 20 may perform control so as to increase the output of the internal combustion engine 2 and supply large electric power to the leg driving actuator. To be specific, when the robot 16 performs work, the generator circuitry 20 may control the driving of the internal combustion engine 2 in accordance with information regarding the energy which is supplied to the actuator and whose amount corresponds to the posture of the robot 16.

Moreover, the motor 3 generates the pressure energy by the driving of the internal combustion engine 2 and supplies the pressure energy to the arm driving actuator 28 and the hand driving actuator 29 through the pressure oil supply interface 31. Therefore, the additional actuators, such as the arm driving actuator 28 and the hand driving actuator 29, which perform the additional work can be driven by the pressure energy. Thus, the robot 16 can perform the additional work by using the actuator that is relatively small and can output high force or torque by hydraulic pressure. The robot 16 can perform a wider variety of additional work.

Moreover, the energy generator 1 includes the battery 4 that stores the energy generated by the motor 3. Therefore, the electric power generated by the motor 3 can be stored in the battery 4, and the stored electric power can be supplied to the actuators of the robot 16. Thus, the electric power that is large to some extend can be supplied to the actuators of the robot 16.

Moreover, the generator circuitry 20 detects the posture state of the energy generator 1 by the posture sensor 38 and controls the driving of the internal combustion engine 2 based on the detected posture state. Therefore, the generator circuitry 20 can perform control suitable for the posture state of the energy generator 1. Thus, for example, since the generator circuitry 20 stops the operation of the internal combustion engine 2 when the inclination of the energy generator 1 is equal to or more than the predetermined inclination limit, the internal combustion engine 2 can operate in a state where the lubricating oil sufficiently reaches the entire internal combustion engine 2. Thus, the operation of the internal combustion engine 2 can be satisfactorily performed.

Moreover, when the energy generator 1 is fixed to the robot 16 by the attaching portions 15*a* of the support frame 15, the internal combustion engine 2 and the motor 3 are supported by the robot 16 through the support frame 15. Therefore, the internal combustion engine 2 and the motor 3 as a single unit can be easily attached to and detached from the robot 16.

Moreover, the intake-exhaust equipment 5 and the radiator 6 are supported by the support frame 15, and the intake-exhaust equipment 5 and the radiator 6 are supported by the robot 16 through the support frame 15. Therefore, the intake-exhaust equipment 5 and the radiator 6 in addition to the internal combustion engine 2 and the motor 3 as a single unit are attached to and detached from the robot 16. Thus, the intake-exhaust equipment 5 and the radiator 6 can be easily attached to and detached from the robot 16.

Moreover, the center of gravity C1 of the energy generator 1 is located at a position closer to the attaching portion 15*a*, attached to the robot 16, than the center C2 of all the cylinders of the internal combustion engine 2. Therefore, the center of gravity of the energy generator 1 can be set to a position close to the robot 16. Thus, the inertial moment acting on the robot 16 by the weight of the energy generator 1 can be reduced. Therefore, the robot 16 can perform work in a stable state.

Moreover, in the energy generator 1, the radiator 6 is attached in the non-attaching region 15*c* different from the attaching region 15*b* attached to the robot 16. Therefore, the radiator 6 can be located at a position away from the robot 16. Thus, the radiator 6 is located at such a position that heat exchange with outside air can be adequately performed without being blocked by the robot 16, and therefore, the cooling of the cooling liquid by the radiator 6 can be satisfactorily performed.

Moreover, the exhaust equipment 13 is located at such a position that the exhaust air is discharged to an outside through a region different from the radiator support region 15*d* and the attaching region 15*b*. Therefore, the exhaust equipment 13 can be located at a position away from the radiator 6. Thus, the radiator 6 can be prevented from being heated by the exhaust equipment 13, and the heat exchange by the radiator 6 can be more satisfactorily performed. Moreover, the exhaust port 10 of the exhaust equipment 13 located at a position away from the radiator 6 discharges the exhaust air in the rear direction. Therefore, the exhaust air can be prevented from flowing toward the radiator 6. Thus, the radiator 6 can be prevented from being heated by the exhaust air, and the heat exchange by the radiator 6 can be more satisfactorily performed.

The above embodiment has described a case where the communication cable 34 as an actual cable and the communication cable 35 as an actual cable are connected to each other by the communication interface 36 as a connector. However, the present disclosure is not limited to the above embodiment. The communication interface 36 may be of a noncontact type. To be specific, the information from the work circuitry 26 of the robot 16 may be transmitted to the generator circuitry 20 of the energy generator 1 by wireless signal transmission. When the information from the work circuitry 26 is transmitted to the generator circuitry 20 by the wireless signal transmission, the communication cables 34 and 35 may be omitted.

Moreover, the information transmitted from the work circuitry 26 of the robot 16 to the generator circuitry 20 of the energy generator 1 may include not only the command from the work circuitry 26 to the generator circuitry 20 but also information indicating the state of the robot 16, information indicating the working state of the robot 16, and the like.

Moreover, the above embodiment has described a case where the pressure energy is supplied to the arm driving actuator 28 and the hand driving actuator 29 in the robot 16 by using the pressure oil to which the pressure energy is given by the driving of the oil pump 2b driven by using part of the driving power of the internal combustion engine 2. However, the present disclosure is not limited to the above embodiment. An energy medium used when supplying the pressure energy to the arm driving actuator 28 and the hand driving actuator 29 in the robot 16 does not have to be the pressure oil. For example, the pressure energy may be transmitted by pneumatic pressure or water. The medium by which the pressure energy is transmitted may be any medium as long as the medium is a fluid.

Moreover, the above embodiment has described a case where the energy generator 1 is carried by the robot 16, which performs bipedal locomotion, on its back. However, the present disclosure is not limited to the above embodiment. The energy generator 1 may be mounted on the robot 16 in a different way. For example, the energy generator 1 may be mounted at a position that is other than the back of the robot 16 and is deviated from the center of gravity of the robot 16 in a direction (left-right direction, front direction) perpendicular to the vertical direction or may be mounted at a position that is deviated from the center of gravity of the robot 16 in the vertical direction. For example, the energy generator 1 may be mounted at an upper part of the robot 16. Furthermore, an abdominal part of the robot 16 may be hollowed out, and the energy generator 1 may be mounted at this position.

Moreover, the above embodiment has described a case where the electric power energy and the operating oil pressure energy are used as the energy used to drive the actuators for the work of the robot 16. However, the other types of energy may be used. For example, part of the rotational driving power from the output shaft 2a of the internal combustion engine 2 may be directly taken out through, for example, a speed reducer to drive the actuators. To be specific, part of the rotational energy of the output shaft 2a may be directly taken out and used to drive the actuators.

As the energy used to drive the actuators for the work of the robot 16, energy other than the electric power energy and the operating oil pressure energy may be used. However, in consideration of the size of the battery for driving the work circuitry 26 that controls the movement work and additional work of the robot 16, it is preferable that the energy used to drive the actuators for the work of the robot 16 be limited to the electric power energy and the operating oil pressure energy. When the energy used to drive the actuators of the robot 16 is limited to the electric power energy and the operating oil pressure energy, the number of types of the energy used in the robot 16 can be reduced, and the control by the work circuitry 26 can be simplified. Therefore, the battery for driving the work circuitry 26 can be reduced in size.

Moreover, the above embodiment has described a case where gasoline is used as the fuel filled in the fuel tank 14. However, the fuel is not limited to the gasoline. For example, light oil may be used. Furthermore, the fuel does not have to be a liquid at ordinary temperature under normal pressure. For example, a liquid, such as LPG (liquefied petroleum gas) or liquid hydrogen, which is prepared by applying pressure to a gas at ordinary temperature under normal pressure and is stored in the fuel tank 14, may be used as the fuel.

Embodiment 2

Next, the energy generator according to Embodiment 2 will be described. Explanations of the same parts as Embodiment 1 are omitted, and only the different parts from Embodiment 1 will be described. Embodiment 1 has described a case where the energy generator is configured such that the fuel tank is located at a relatively upper position, and therefore, the fuel tank is located at a position higher than the output shaft of the internal combustion engine and the input shaft of the motor. The energy generator of Embodiment 2 is different from the energy generator of Embodiment 1 in that the fuel tank is located at a position lower than the internal combustion engine.

FIGS. 5A and 5B are perspective views each showing an energy generator 1a of Embodiment 2. In Embodiment 2, a fuel tank 14a is located at a position lower than the internal combustion engine 2 and the motor 3. In Embodiment 2, in a space which is in the accommodating region 40 surrounded by the support frame 15, is located at an upper position where the fuel tank of Embodiment 1 is located, and is close to the attaching portions 15a, the battery 4a is located instead of the fuel tank.

In the energy generator 1a of Embodiment 2, the fuel tank 14a that is relatively heavy is located at a lower position in the accommodating region 40 surrounded by the frame 15. Therefore, the center of gravity can be set to a lower position in the energy generator 1a.

Figure 6:
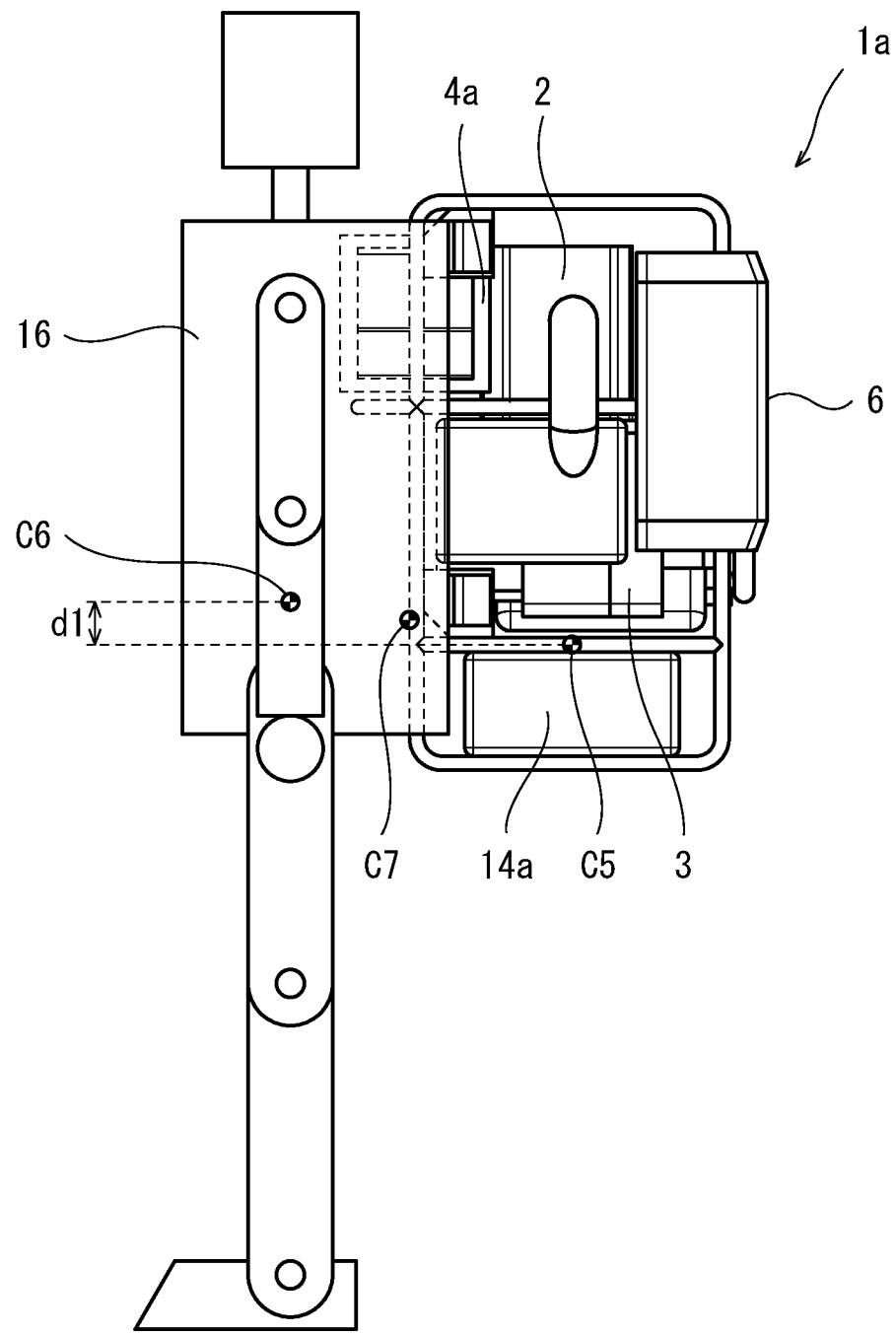
FIG. 6 is a side view showing that the robot on which the energy generator shown in FIGS. 5A and 5B is mounted stands upright.

FIG. 6 is a side view showing the energy generator 1a of Embodiment 2 and the robot 16 to which the energy generator 1a is attached. In FIG. 6, the robot 16 is in an upright state.

The center of gravity of the energy generator 1a of the present embodiment is shown by C5. Moreover, the center of gravity of the robot 16 in the upright state is shown by C6. Furthermore, the center of gravity of an entire configuration including the robot 16 and the energy generator 1a mounted on the robot 16 is shown by C7. The center of gravity of the energy generator 1a of the present embodiment is lowered by lowering the position of the fuel tank 14a. Therefore, the center of gravity C5 of the energy generator 1a is located at a position lower than the center of gravity C6 of the robot 16 in the upright state. In the present embodiment, as shown in FIG. 6, the center of gravity C5 of the energy generator 1a is located at a position lower by dl than the center of gravity C6 of the robot 16 in the upright state.

In Embodiment 2, when the energy generator 1a is mounted on the robot 16, the center of gravity moves from C6 to C7 as shown in FIG. 6. When the center of gravity moves, the load acting on the leg driving actuator that drives the legs 17 when the robot 16 moves or performs work changes. When the communication cable 35 of the robot 16 and the communication cable 34 of the energy generator 1 are connected to each other through the communication interface 36, the work circuitry 26 of the robot 16 can detect it. When the work circuitry 26 recognizes that the energy generator 1 is connected to the robot 16, the work circuitry 26 determines that the center of gravity has moved from C6 to C7. Then, the work circuitry 26 supplies the energy, the amount of which corresponds to the movement of the center of gravity, to the actuators to drive the robot 16.

In the present embodiment, the center of gravity C5 of the energy generator 1a is set to be low. Therefore, when the energy generator 1a is attached to the robot 16, the center of gravity C7 of the robot 16 to which the energy generator 1a is attached can be set to be low. Thus, the robot 16 hardly falls. Moreover, since the robot 16 can perform work in a stable state, the accuracy of the work of the robot 16 can be improved.

Embodiment 3

Next, the energy generator according to Embodiment 3 will be described. Explanations of the same parts as Embodiment 1 and Embodiment 2 are omitted, and only the different parts from Embodiment 1 and Embodiment 2 will be described. Each of Embodiments 1 and 2 has described a case where the energy generator is attached to the robot that can stand by itself with two legs and perform bipedal locomotion. Embodiment 3 is different from Embodiment 1 and Embodiment 2 in that the energy generator is attached to a robot that stands by itself with four legs.

Figure 7:
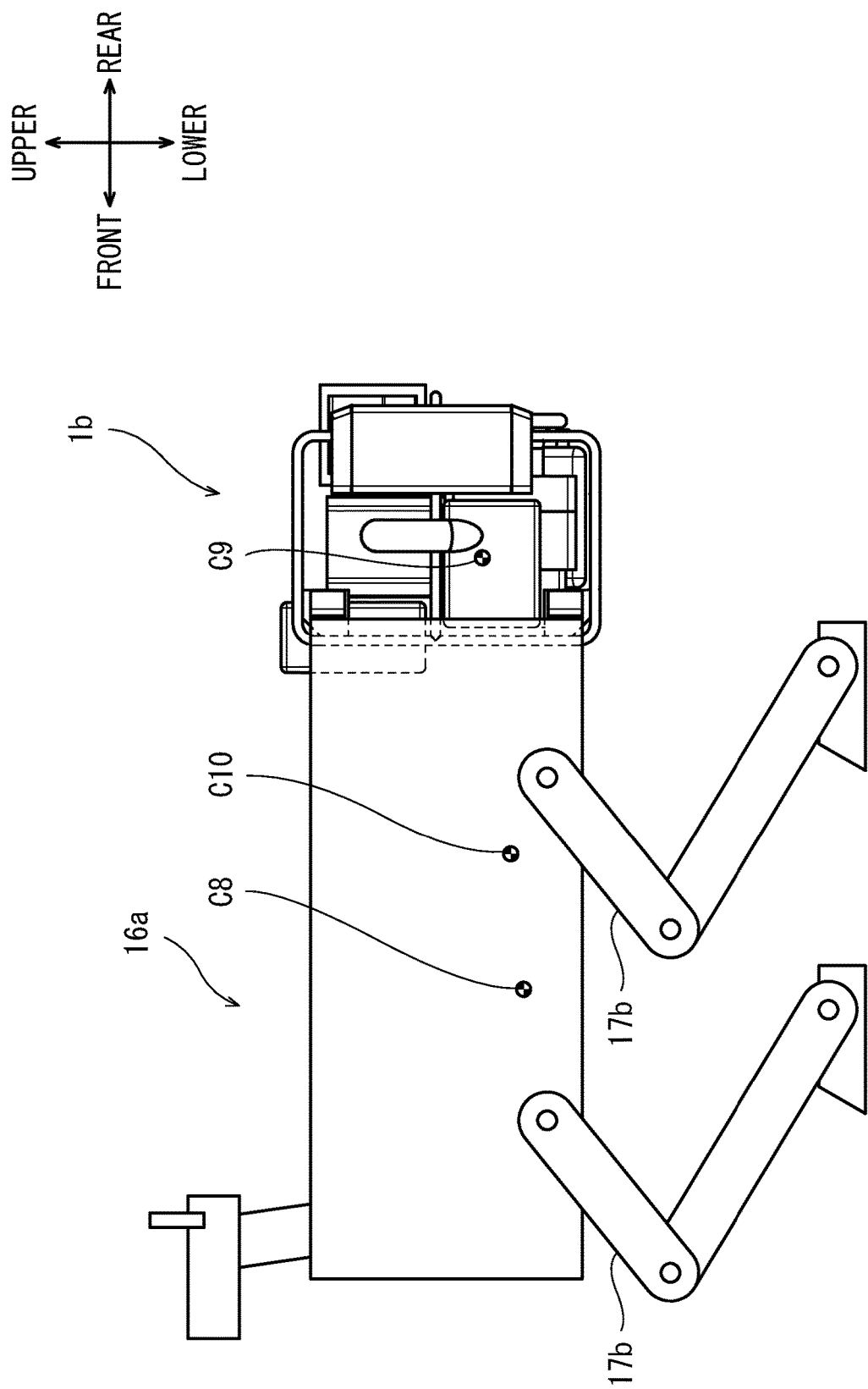
FIG. 7 is a side view showing the energy generator according to Embodiment 3 and the robot to which the energy generator is attached.

FIG. 7 is a side view showing an energy generator 1b of Embodiment 3 and a robot 16a to which the energy generator 1b is attached. In Embodiment 3, the robot 16a includes four legs 17b. The energy generator 1b used in Embodiment 3 is similar in type to the energy generator described in Embodiment 1 and is shown in the drawing, but may be similar in type to the energy generator 1a described in Embodiment 2.

The robot 16a moves by walking with four legs. Therefore, in the present embodiment, the leg driving actuator that drives the four legs 17b corresponds to the movement actuator that performs the movement work. In the present embodiment, the robot 16a does not include the additional actuator that performs the additional work different from the movement work. The robot 16a may include the additional actuator that performs the additional work different from the movement work.

In the present embodiment, the center of gravity of the robot 16a that stands by itself with four legs is shown by C8. Moreover, the center of gravity of the energy generator 1b is shown by C9. Furthermore, the center of gravity of an entire configuration including the robot 16a and the energy generator 1b mounted on the robot 16a is shown by C10. When the energy generator 1b is mounted on the robot 16a, the center of gravity moves from C8 to C10 as shown in FIG. 7. In the present embodiment, when the energy generator 1b is mounted on the robot 16a, and the work circuitry of the robot 16a recognizes that the energy generator 1 is connected to the robot 16, the work circuitry of the robot 16a determines that the center of gravity has moved from C8 to C10. Then, the work circuitry of the robot 16a supplies the energy, the amount of which corresponds to the movement of the center of gravity, to the actuators to drive the robot 16a.

As above, the working equipment that performs the movement work or the additional work different from the movement work may be a robot other than the robot that performs bipedal locomotion. The working equipment may be the robot 16a that walks with the four legs 17b as in Embodiment 2. Moreover, the working equipment may be a robot other than the robot that walks. For example, the working equipment may be a robot that moves by using wheels. Furthermore, the shape of the working equipment does not have to be a shape that imitates a human or an animal. The shape of the working equipment may be any shape as long as the working equipment is mobile working equipment that performs movement work.

REFERENCE CHARACTER LIST 1, 1a, 1b energy generator
2 internal combustion engine
2b oil pump (power generator)
3 motor (power generator, electric generator)
4 battery (energy storing equipment)
5 intake-exhaust equipment
6 radiator
13 exhaust equipment
14, 14a fuel tank
15 support frame
15a attaching portion
15b attaching region
15c non-attaching region
15d radiator support region
16, 16a robot (working equipment)
17, 17b leg (movement actuator)
17a ground contact surface
18 hand (additional actuator)
19 arm (additional actuator)
20 generator circuitry
26 work circuitry
31, 33 supply interface
36 communication interface
40 accommodating region
A1 vertical region

The invention claimed is:

1. An energy generator which is mounted on mobile working equipment and supplies operating power, required for work, to the working equipment, the energy generator comprising:
an internal combustion engine;
a power generator that is driven by the internal combustion engine to generate the operating power;
a communication interface that receives information given from the working equipment;
a supply interface that supplies the operating power to the working equipment;
circuitry configured to control at least one of the internal combustion engine and the power generator based on the information given from the working equipment through the communication interface; and
a support frame that is fixed to the working equipment such that the internal combustion engine and the power generator are supported by the working equipment through the support frame, wherein
the support frame includes an attaching portion which is attached to, detached from, and fixed to the working equipment; and
in a state where the energy generator is detached from the working equipment, the support frame contacts a ground surface and supports weight of the energy generator.

2. The energy generator according to claim 1, wherein:
the working equipment includes
a movement actuator that performs movement work and
an additional actuator that performs additional work different from the movement work; and
the circuitry controls at least one of the internal combustion engine and the power generator based on information regarding the movement actuator and information regarding the additional actuator.

3. The energy generator according to claim 1, wherein the circuitry controls at least one of the internal combustion engine and the power generator based on information indicating a working state of the working equipment in a self-standing posture.

4. The energy generator according to claim 1, wherein the power generator generates pressure energy by driving of the internal combustion engine; and
the supply interface includes a pipe which supplies the pressure energy by being connected to the working equipment.

5. The energy generator according to claim 4, wherein:
pressure oil flows through the pipe; and
the supply interface supplies the pressure energy to the working equipment through hydraulic pressure of the pressure oil to supply the operating power.

6. The energy generator according to claim 1, further comprising energy storing equipment that stores energy generated by the power generator.

7. The energy generator according to claim 1, wherein the circuitry determines a posture state based on a predetermined condition and performs control corresponding to the determined posture state;
the posture state denotes an inclination of the energy generator; and
when the circuitry determines that the inclination of the energy generator is equal to or more than a predetermined inclination limit, the circuitry stops an operation of the internal combustion engine.

8. The energy generator according to claim 1, wherein:
the internal combustion engine includes intake-exhaust equipment and a radiator that cools a cooling liquid;
the power generator is an electric generator; and
the intake-exhaust equipment, the radiator, and the electric generator are supported by the support frame.

9. The energy generator according to claim 8, wherein:
the internal combustion engine includes exhaust equipment;
the radiator is located outside the support frame;
the support frame includes a radiator support region where the radiator is supported and an attaching region where the attaching portion is located; and
the exhaust equipment is located at such a position that exhaust air is discharged to an outside through a region different from the radiator support region and the attaching region.

10. The energy generator according to claim 1, wherein a center of gravity of the energy generator is located at a position closer to the attaching portion than a center of all cylinders of the internal combustion engine.

11. The energy generator according to claim 1, wherein:
the internal combustion engine includes a radiator that cools a cooling liquid;
the support frame has a cubic frame shape and includes an attaching region where the attaching portion is located and a non-attaching region other than the attaching region; and
the radiator is attached in the non-attaching region.

12. The energy generator according to claim 1, wherein the internal combustion engine, the power generator, the communication interface, the supply interface, and the circuitry are accommodated inside the support frame.

13. The energy generator according to claim 1, wherein:
the internal combustion engine includes exhaust equipment;
the exhaust equipment includes an exhaust port through which exhaust air is discharged to an outside; and
when the support frame is fixed to the working equipment by the attaching portion, the exhaust port is directed such that the exhaust air is discharged in a direction away from the working equipment.

14. The energy generator according to claim 1, wherein the communication interface transmits to the working equipment, information regarding a remaining amount of fuel, a temperature of the internal combustion engine, abnormality of the internal combustion engine, or deterioration of the internal combustion engine.

15. The energy generator according to claim 1, further comprising:
a fuel tank that stores fuel to be supplied to the internal combustion engine; and
a battery that stores electric energy of the operating power generated by the power generator, wherein
when the support frame is fixed to the working equipment by the attaching portion, the fuel tank or the battery is located close to the working equipment.

16. A robot system comprising:
a walking robot including:
a leg for walking, and
a leg driving actuator that drives the leg; and
the energy generator according to claim 1 that is mounted on the walking robot and generates energy which drives the leg driving actuator, wherein
the internal combustion engine of the energy generator includes an output shaft; and
the output shaft extends in a horizontal direction.

17. The robot system according to claim 16, wherein the power generator is configured to generate the operating power for the walking robot; and
the output shaft of the internal combustion engine and an input shaft of the power generator are coaxially connected to each other.

18. The robot system according to claim 17, further comprising energy storing equipment that stores energy generated by the power generator, wherein
the energy storing equipment is located higher than the output shaft of the internal combustion engine and the input shaft of the power generator.

19. An energy supply system comprising:
mobile working equipment; and
an energy generator that supplies operating power, required for work, to the working equipment, wherein:
the energy generator includes
an internal combustion engine, a power generator that is driven by the internal combustion engine to generate the operating power, a communication interface that receives information given from the working equipment, a supply interface that supplies the operating power to the working equipment, circuitry configured to control at least one of the internal combustion engine and the power generator based on the information given from the working equipment through the communication interface, and an attaching portion attached to the working equipment;

the working equipment is a robot that stands upright with two legs;

the robot includes:
an attached portion to which the attaching portion is attached, and a ground contact surface that contacts a ground surface; and the energy generator is located at a position away from a vertical region, which extends vertically upward from the ground contact surface, in a direction orthogonal to a vertical direction.

* * * * *